United States Patent
Bergey

[11] 3,722,206
[45] Mar. 27, 1973

[54] SELF-ILLUMINATED LIQUID CRYSTAL TIMEPIECE

[75] Inventor: John M. Bergey, Lancaster, Pa.

[73] Assignee: HMW Industries, Inc., Lancaster, Pa.

[22] Filed: Mar. 1, 1971

[21] Appl. No.: 119,806

Related U.S. Application Data

[63] Continuation of Ser. No. 794,551, Jan. 28, 1969, abandoned.

[52] U.S. Cl..................................58/50, 350/150
[51] Int. Cl................................G04b 19/30
[58] Field of Search ..58/50; 240/6.43; 350/150, 151, 350/160, 161

[56] References Cited

UNITED STATES PATENTS

| | | | |
|---|---|---|---|
| 3,505,804 | 4/1970 | Hofstein | 58/23 |
| 3,322,485 | 5/1967 | Williams | 350/160 |

FOREIGN PATENTS OR APPLICATIONS

| | | | |
|---|---|---|---|
| 10,327 | 4/1911 | Great Britain | 58/50 |

OTHER PUBLICATIONS

Electronic World, Reflective Liquid Crystal Displays Nov., 1968, Pinsky, Al. (author) p. 29, 58

*Primary Examiner*—Richard B. Wilkinson
*Assistant Examiner*—Edith C. Simmons
*Attorney*—Le Blanc & Shur

[57] ABSTRACT

The time piece includes seven-bar-segment digital time indicating displays, the segments being selectively actuated by a time indicating source through a logic circuit. In one form, the display face includes a clear front glass, a dark back reflector glass spaced from the front glass, liquid crystals disposed between the glasses and an electrode material formed on the back glass with portions thereof removed while the remaining portions form electrodes for the seven bar segments. Selected energization of the electrodes energizes the liquid crystal segments to provide a light scattering effect whereby light incident to the energized liquid crystal segments is reflected to provide a digital display against a dark background. A nuclear powered light source surrounds the display face to provide light incident to the energized liquid crystals for digital display under dark conditions. In another form, the front glass is coated white except for the segments and a nuclear powered light source is located behind the rear clear glass plate on which the electrodes are carried. In the daytime, the energized bar segments reflect light rendering the same indistinguishable from the white opaque surface whereby the natural dark color of the nuclear light source appears through the nonenergized and transparent liquid crystal bar segments providing a daytime digital time display. For night-time display, the nuclear powered light source transmits light through the nonenergized liquid crystal bar segments to provide the digital time display.

16 Claims, 5 Drawing Figures

INVENTOR
JOHN M. BERGEY

BY
Le Blanc & Shur
ATTORNEYS

SELF-ILLUMINATED LIQUID CRYSTAL TIMEPIECE

The present application is a continuation of my copending application Ser. No. 794,551, filed Jan. 28, 1969, for SELF-ILLUMINATED LIQUID CRYSTAL TIMEPIECE which is now abandoned.

The present invention relates to timepieces and more particularly relates to timepieces such as watches, clocks and the like having digital time displays which are readily readable under variable lighting conditions.

Various methods have heretofore been employed to render watch or clock dials readable under variable lighting conditions, i.e. day, night or semidark lighting conditions. For example, it is common knowledge to provide watch or clock dials formed either with luminous numerals against a nonluminous background or a luminous background and nonluminous numerals to provide readability under low light conditions. Additionally ly, watch and clock dial faces have been provided with auxiliary light sources to light the dial under dark conditions. It has also previously been known to provide clocks utilizing florescent materials which can be irradiated by ultraviolet rays for reading in the dark.

While timepieces having fixed dials and numeral displays and provided with various devices to provide readability during various lighting conditions are abundant throughout the prior art, the advent of digital displays for watches, clocks and the like has raised significantly different problems in providing digital readability under all lighting conditions than those problems heretofore encountered with the display of fixed numerals on prior watch or clock dials. Moreover, the problem of providing digital readability for watch displays is compounded by the necessary compactness of watches which affords little space and inadequate power for elaborate and known lighting techniques.

In accordance with the present invention, there is provided a digital time display in a watch, clock or the like which is readable under all lighting conditions. To accomplish this, the present digital time display makes use of the electromagnetic-optical properties of liquid crystals in combination with a self-contained nuclear powered light source. A liquid crystal is a substance whose rheological behavior is similar to the crystalline state over a given temperature range, an example of which is the nematic substance p-azoxyanisole. One of the characteristics of liquid crystals in the nematic class is their optical effect in two different states. In a quiescent state with no energy field applied, the liquid crystal is essentially transparent. However, when an energy field is applied, either electric or magnetic, the liquid crystal exhibits light scattering characteristics.

To employ this phenomenon in a digital time display readable under variable lighting conditions, there is provided in accordance with the present invention, a display face in a watch, clock or similar timepiece having a clear front glass plate and a dark back reflector glass plate spaced one from the other with the liquid crystal sandwiched therebetween. In a preferred form, clear metal electrodes are provided on the back plate and disposed to provide a plurality of seven-bar-segment digital displays. In a watch, four seven-bar-segments are arranged in side-by-side relation to display the hours and minutes in digital form (the tens of hours digit may be a four-bar-segment) although it will be appreciated that six seven-bar-segments could be utilized wherein hour, minutes and seconds would be displayed in digital form. A nuclear powered light source, preferably a Betalight, is disposed about the face of the display slightly outwardly thereof as to provide light incident to the display. Under day lighting conditions, selected energization of the electrodes applies an energy field through the liquid crystals disposed between the selected electrodes wherein the energized liquid crystal bar segments display a light scattering optical effect. In other words, when the bar-segment is energized, ambient light incident on the face of the display is reflected by the energized liquid crystal bar-segments as to be readable under day lighting conditions against the dark background. Thus, by selectively energizing the bar-segments of each of the digital displays, a clearly readable and distinguishable time display is provided under day lighting conditions. Under substantial dark conditions, the liquid crystals of the various bar-segments are selectively energized as before and the nuclear powered light source about the display face provides the necessary incident light which is reflected from the energized liquid crystal bar-segments. The reflected light of the nuclear powered light source from the energized liquid crystal bar-segments is sufficiently bright under dark conditions as to provide a readable and clearly distinguishable digital time display.

In another form hereof, the display face is coated with a white opaque material (with the exception of the face portions overlying the seven-bar segments formed by the electrode coated clear rear glass plate) and a nuclear powered light source, preferably a Betalight emitting plate, is disposed behind the clear rear glass plate. The white coated front glass plate thus outlines the seven bar segments of the digital display. When the liquid crystals of the selected segments are energized, ambient light under day lighting conditions is reflected and this reflected light of the energized segments and the white coated display face blend in color as to be indistinguishable one from the other. The digital time display is thus provided by the non-energized liquid crystals which, as noted previously, are transparent in this state. Accordingly, the natural dark color of the Beta light source behind the display is exhibited through the non-energized liquid crystal segments. Under dark conditions, the energized liquid crystal segments reflect the light from the Betalight source back towards the Betalight source and prevent transmission of such Betalight through the front glass of the display. The non-energized segments, however, are transparent and permit the light from the Beta source to be transmitted through the associated non-energized liquid crystals whereby the numeral display is readily readable with clear digital definition.

Accordingly, it is the primary object of the present invention to provide a digital time display readable under variable lighting conditions.

It is another object of the present invention to utilize the optical properties of liquid crystals in conjunction with a nuclear powered light source to provide a digital time display under variable lighting conditions.

It is still another object of the present invention to provide a digital time display in a watch wherein the display increases in visibility and contrast as the surrounding light increases and wherein such digital time display can be employed under dark conditions.

It is a further object of the present invention to provide in a digital time display the combined read-out effects of electronically stimulated liquid crystals with a self-powered nuclear light source such that the time display can be readily viewed under light, dark or semidark conditions.

It is a still further object of the present invention to provide a digital time display readable under light, dark, and semidark conditions having extremely small power requirements and manufactured from low cost materials.

These and further objects and advantages of the present invention will become more apparent upon reference to the following specification, appended claims and drawings wherein:

Figure 1:
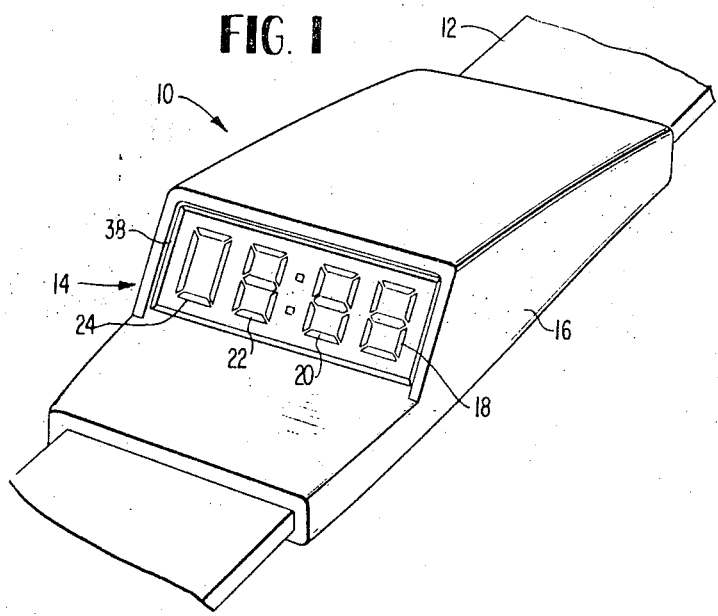
FIG. 1 is a perspective view of a self illuminated liquid crystal watch having a digital time display viewable under all lighting conditions and constructed in accordance with the present invention.
Figure 4:
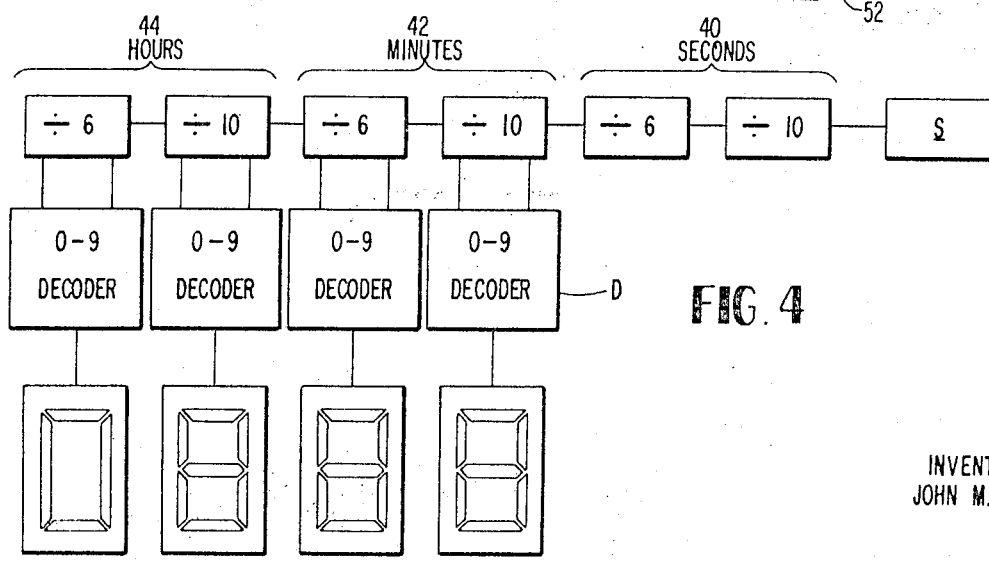
FIG. 4 is a diagram schematically illustrating the drive mechanism for the watch hereof.

Referring now to the drawings, particularly to FIG. 1, there is illustrated a watch, generally indicated at 10, having a watch band 12 and a time display face, generally indicated at 14. Watch 10 includes a casing 16 housing a timekeeping source, not shown, and circuitry for translating the timekeeping function of the source into digital form for display through face 14. Details of the timekeeping source and circuitry are schematically illustrated in FIG. 4 and are briefly described below, it being sufficient for present purposes to state briefly that four digital display stations 18, 20, 22 and 24 are exposed for display of selected time indicating digits through face 14. Two more stations similar to 18 could be employed if seconds are to be displayed. Face 14 inclines upwardly at an angle from housing 16 as to be readily viewable by the wearer of the watch when the wearer's arm is naturally raised to bring the watch casing into full view by the wearer.

In the preferred form, the digital display stations are arranged across the face 14 to display hours and minutes. For example, and as seen in FIG. 1, the right-hand display station 18 comprises a seven-bar-segment arranged to display minutes in selected units from zero to nine while the next adjacent station 20 includes a seven-bar-segment arranged to display selected tens of minutes from zero to five, whereby the full range of minutes from zero to 59 can be displayed through the pair of seven-bar segment stations 18 and 20. Display station 22 includes a seven bar segment arranged to display the hours in selected units from zero to nine, while the next adjacent station 24 comprises a four-bar-segment arranged to display selected tens of hours in units from zero to one, whereby the hours from zero to eleven can be displayed through the pair of bar-segments 22 and 24. It will be noted that the last segment 24 comprises a four-bar-segment as it is not necessary to provide a full seven-bar-segment where only the digits zero and one are to be displayed. A full seven-bar segment could, however, be employed in lieu of four-bar segment, if desirable.

Figure 3:
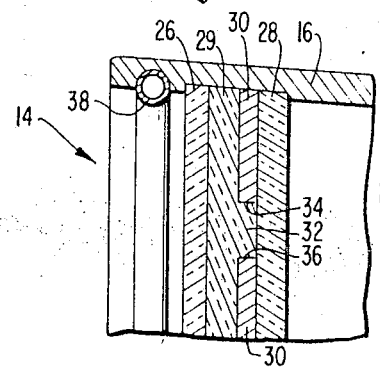
FIG. 3 is an enlarged fragmentary cross sectional view of one of the bar-segments and the nuclear power source about the display face and is taken generally about on line 3—3 in FIG. 2.

Referring now to FIG. 3, one of the bar segments (the uppermost segment at station 18) is illustrated, and it will be appreciated that the remaining bar segments of that station and the bar segments of each of the other digital display stations are similarly constructed. Display face 14 comprises a front, substantially transparent plate 26, preferably formed of glass, and a rear plate 28 formed of a dark material, for example, a dark gray reflective glass. Plates 26 and 28 are spaced one from the other by suitable spacers, not shown, and a liquid crystal substance 29 described below, is disposed therebetween, preferably coextensively with plates 26 and 28. The front surface of rear plate 28 is coated with a transparent electrode material, indicated at 30, with portions of the surface remaining uncoated and defining a pair of electrodes across each of the bar-segments at each station 18, 20, 22 and 24. For example, coating 30 may be applied over the entire front surface of rear plate 28 with the electrode material subsequently being etched away to define a pair of electrodes for each segment of the seven-bar-segments 18, 20, 22 and the four-bar-segment 24, as well as to electrically insulate the electrode pairs from one another. As illustrated in FIG. 3, the top bar segment of the seven-bar-segment 18 is shown at 32 with the edges of the electrode material as at 34 and 36 forming a pair of electrodes. Each of the bar segments at each display station 18, 20, 22 and 24 is similarly formed as to provide electrodes across the etched portions of the electrode material. The electrode pairs may be suitable electrically insulated (as by etching) one from the other or, as will be apparent to those skilled in the art, the potential of selected individual electrodes of the various bar segments can be identical, for example, at ground. For reasons as will presently become clear, a light source 38 is provided about display face 14 outwardly of front plate 26. Preferably, source 38 comprises a self-powered nuclear light source, for example, a Betalight ring. Betalight ring 38 may comprise a generally rectangular sealed glass tube disposed about face 14, which tube is internally coated with a phosphor and filled with tritium gas. The radioactive tritium, on decay, emits electrons which are absorbed by the phosphor, causing it to emit light continuously in the visible spectrum. Betalights are well known in the art and further description thereof is believed unnecessary.

Referring now to FIG. 4, there is shown a time source S which may comprise any suitable pulse generator, the output of which is fed to a series of dividers 40, 42, and 44. These dividers convert the output from source S into binary decimal signals which, in turn, are converted, by decoders D, into the energizing code for the bar-segment displays. The logic circuitry for converting the binary decimal signal into the bar-segment output for each digital display is well known in the art and does not per se form any part of the present invention. Any suitable digital logic circuitry may be employed for this purpose. It is sufficient for present purposes to note that the pairs of electrodes defining the bar-segments can be selectively energized in a timed sequence to provide a digital time display.

As noted previously, a liquid crystal substance 29 is disposed between plates 26 and 28. The term liquid crystal, as herein-employed, is applied to substances whose rheological behavior is similar to that of fluids but whose optical behavior is similar to the crystalline state over a given temperature range. Such substances exhibit mesomorphic behavior and, of the three states of mesomorphic behavior, the nematic state exhibits the electro-magnetic-optic effect utilized in the present digital time display. A preferred nematic liquid crystal having the required electrical-magnetic-optical properties is p-azoxyanisole. This material exhibits the desired mesomorphic behavior within a particular temperature range and means, not shown, are provided to maintain the liquid crystal within such temperature range. Characteristic of this liquid crystal under these conditions and with no electric or magnetic field applied, is its substantial transparency. However, when a field, either electric or magnetic, is applied, such liquid crystal becomes turbulent and scatters light, the effect of which is to reflect light which appears white. An additional characteristic of this liquid crystal is the fact that the greater the incident light on the energized liquid crystal, the greater the reflectivity, brightness and hence contrast with the surrounding environment.

Figure 2:
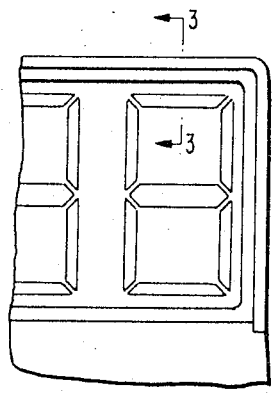
FIG. 2 is a fragmentary elevational view of the display face illustrating particularly a seven-bar-segment digit.

With reference now to FIGS. 1–3, it will be appreciated that, when the portions of the liquid crystal 29 disposed between the electrodes of the bar segments remain in an unenergized state, the dark background of the rear plate 28 underlying such portions will be seen through the front transparent plate 26 and the transparent liquid crystal. Accordingly, in viewing the display face 14 under daylight conditions, the dark background afforded by rear plate 28 will be seen through the transparent electrode material 30 (essentially the entire display face 14) and through the portions of the liquid crystal lying between the electrodes of the unenergized bar segments. However, the electrodes, which are energized through the logic circuitry illustrated in FIG. 4, energize the liquid crystals therebetween such that incident ambient light is scattered. This incident light, which is thus reflected, appears white against the dark surrounding background. Accordingly, the energized liquid crystal bar segments provide a readily readable and clearly distinguishable time display in digital form, the digits being formed by the selectively energized liquid crystal bar segments which appear white by scattering incident ambient light and hence contrast with the dark background of the rear plate 28. Moreover, the greater the incident or ambient light, the greater the contrast.

Under dark or semi-dark lighting conditions, the nuclear powered light source 38 about display face 14 provides the necessary light incident to the energized liquid crystal bar segments whereby the latter appear white against the dark background similarly as under day lighting conditions. The Betalight ring about the display face provides sufficient light incident to the energized liquid crystal bar segments such that this light can be reflected or scattered to provide clearly distinguishable bar-segments, and hence a clearly readable digital time display under dark or semidark conditions.

Figure 5:
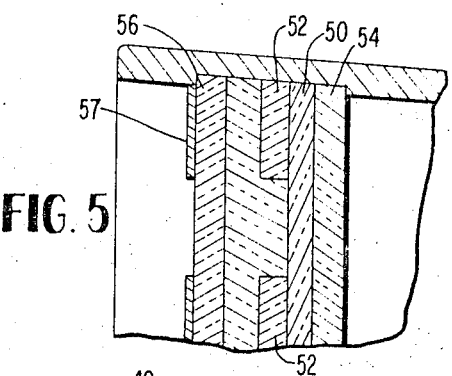
FIG. 5 is a fragmentary enlarged cross sectional view of the display face similar to FIG. 3 and illustrating another form of the invention hereof with the nuclear powered light source disposed behind the display face.

In the form of the invention hereof illustrated in FIG. 5, there is illustrated a display face 14a having a rear clear transparent plate 50, preferably glass, on which is coated an electrode material 52, arranged similarly as in the previous form to provide pairs of electrodes defining individual bar-segments of each digital display. Behind the rear plate 50 is a light source, and may take the form of a self-contained, nuclear powered Betalight-emitting plate 54. Plate 54 has a natural dark color under day lighting conditions which is utilized in this embodiment as described hereinafter. The front plate 56 is coated with a white opaque material 57 with the areas overlying the bar segments left uncoated.

In this form, and under day lighting conditions, the energized bar segments reflect or scatter light and appear white, rendering the same indistinguishable from the surrounding white opaque surface 57 of the outer plate 56. The unenergized liquid crystal bar segments, however, remain transparent. The natural dark background color of the nuclear light source 54 accordingly appears through the clear back glass 50, the unenergized transparent liquid crystal bar segments, and the associated clear bar segments of the coated front glass 56 overlying the unenergized bar segments to provide a dark contrast in digital form with the surrounding white surface of plate 56 and the white appearing energized segments in digital form. In this manner, the non-energized portions of the liquid crystal bar segments define the digits. Under dark or semi-dark lighting conditions, the energized portions of the liquid crystal bar segments reflect or scatter the light incident thereupon from the nuclear powered light plate 54 and this light is reflected back toward the plate 54 and does not appear through the display face 14a. The non-energized liquid crystal bar segments, however, being transparent in nature, permit the transmission of light from the beta light plate 54 through the transparent rear plate 50, the transparent liquid crystal of the associated nonenergized bar segments, and the uncoated segments of the plate front 56 overlying the non-energized liquid crystal bar segments as to be distinguishable against the background of the display face 14a. Thus, in daylight conditions, the natural color of the beta light plate is seen through the transparent non-energized liquid crystal bar segments to define the digital display and under nighttime conditions the light emitted from the Betalight is transmitted through the non-energized liquid crystal bar segments to define the digital display. Logic circuitry complementary to the circuitry employed in the embodiment hereof illustrated in FIGS. 3 can be employed as will be apparent to those skilled in the art.

The present invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A display for an electrical timepiece operable under variable external lighting conditions comprising means for displaying information including material having electromagnetic-optical properties wherein said material is substantially transparent in a quiescent state and has substantial light-scattering properties when an energy field is applied thereto, a source of electrical timing signals, means for applying said electrical timing signals to at least portions of said material to provide an energy field for displaying timing information under one external lighting condition, a display face having a pair of plates spaced one from the other with said material being disposed between said plates, pairs of electrodes disposed between said plates and arranged to define said information, at least a portion of said material lying between said electrodes, wherein said electrodes are carried by one of said plates, and an auxiliary self-powered light source adjacent said material and providing light incident to said material for displaying timing information under a second external lighting condition.

2. Apparatus according to claim 1 wherein said material fills substantially the entire space between plates.

3. Apparatus according to claim 1 wherein the innermost plate of said display face is formed to provide a dark background, said auxiliary light comprising a nuclear light source about at least a portion of said face.

4. Apparatus according to claim 1 wherein the outermost plate is opaque, said light source including a nuclear light source behind said innermost plate, said information defining means including substantially transparent portions of said opaque plate overlying said material.

5. Apparatus according to claim 1 wherein said auxiliary source is disposed behind said plates for transmitting light through said material outwardly of said face when said material lies in a quiescent state.

6. Apparatus according to claim 1 wherein said material is a liquid crystal in the nematic state.

7. Apparatus according to claim 6 wherein said auxiliary light source comprises a beta light.

8. A timepiece of sufficiently small size for use as a wristwatch and having a display viewable under variable external lighting conditions comprising a watch case including a time display face, material mounted in said watch face having electro-magnetic-optical properties wherein said material is substantially transparent in a quiescent state and has substantial light-scattering properties when an energy field is applied thereto, said material being arranged in bar segments on said face to form a digital time display, a display face having a pair of plates spaced one from the other with said material being disposed between said plates, pairs of electrodes disposed between said plates and arranged to define said information, at least a portion of said material lying between said electrodes, wherein said electrodes are carried by one of said plates, a timekeeping source in said case, means responsive to said timekeeping source for providing energy fields to selected portions of said material for digital time display under a first external lighting condition, and a self-powered light source mounted on said case adjacent said material to provide light incident to said material for digital time display under a second external lighting condition.

9. A timepiece according to claim 8 wherein said auxiliary light source is located such that the light therefrom incident to said material is reflected outwardly of said display from the portions of said material subjected to the energy fields.

10. A timepiece according to claim 8 wherein said auxiliary light source is disposed behind said material for transmitting light outwardly of said display through the portions of said material lying in a quiescent state.

11. A timepiece according to claim 8 wherein said timekeeping source includes a plurality of dividers for obtaining electrical timing signals, and means coupling said electrical timing signals to said bar segments.

12. A timepiece according to claim 11 wherein said coupling means comprises a plurality of decoders for transforming the output of said dividers into drive signals for said bar segments.

13. A timepiece of sufficiently small size for use as a wristwatch and having a display viewable under variable external lighting conditions comprising means for displaying information including liquid crystal material having electro-optical properties wherein said material is substantially transparent in a quiescent state and has substantial light-scattering properties when an electric field is applied thereto, a source of electrical timing signals, means for applying said electrical timing signals to at least portions of said material to provide an electric field for displaying timing information under one external lighting condition, a display face having a pair of plates spaced one from the other with said material being disposed between said plates, pairs of electrodes disposed between said plates and arranged to define said information, at least a portion of said material lying between said electrodes, and an auxiliary self-powered light source adjacent said material and providing light incident to said material for displaying timing information under a second external lighting condition.

14. Apparatus according to claim 13 wherein said auxiliary light source comprises a nuclear source.

15. Apparatus according to claim 13 wherein said auxiliary light source comprises a beta light.

16. A wristwatch having a display viewable under variable external lighting conditions comprising a wristwatch case including a time display face, liquid crystal material mounted on said watch face having electro-optical properties wherein said material is substantially transparent in a quiescent state and has substantial light-scattering properties when an electric field is applied thereto, said material being arranged in bar segments on said face to form a digital time display, the display face having a pair of plates spaced one from the other with said material being disposed between said plates, pairs of electrodes disposed between said plates and arranged to define said information, at least a portion of said material lying between said electrodes, a timekeeping source in said case, means responsive to said timekeeping source for providing electric fields to selected portions of said material for digital time display under a first external lighting condition, and a beta light mounted on said case adjacent said material to provide light incident to said material for digital time display under a second external lighting condition.

* * * * *